(No Model.)
C. A. HAMMOND & R. D. SUTHERLAND.
STEAM COUPLING.
No. 412,609. Patented Oct. 8, 1889.
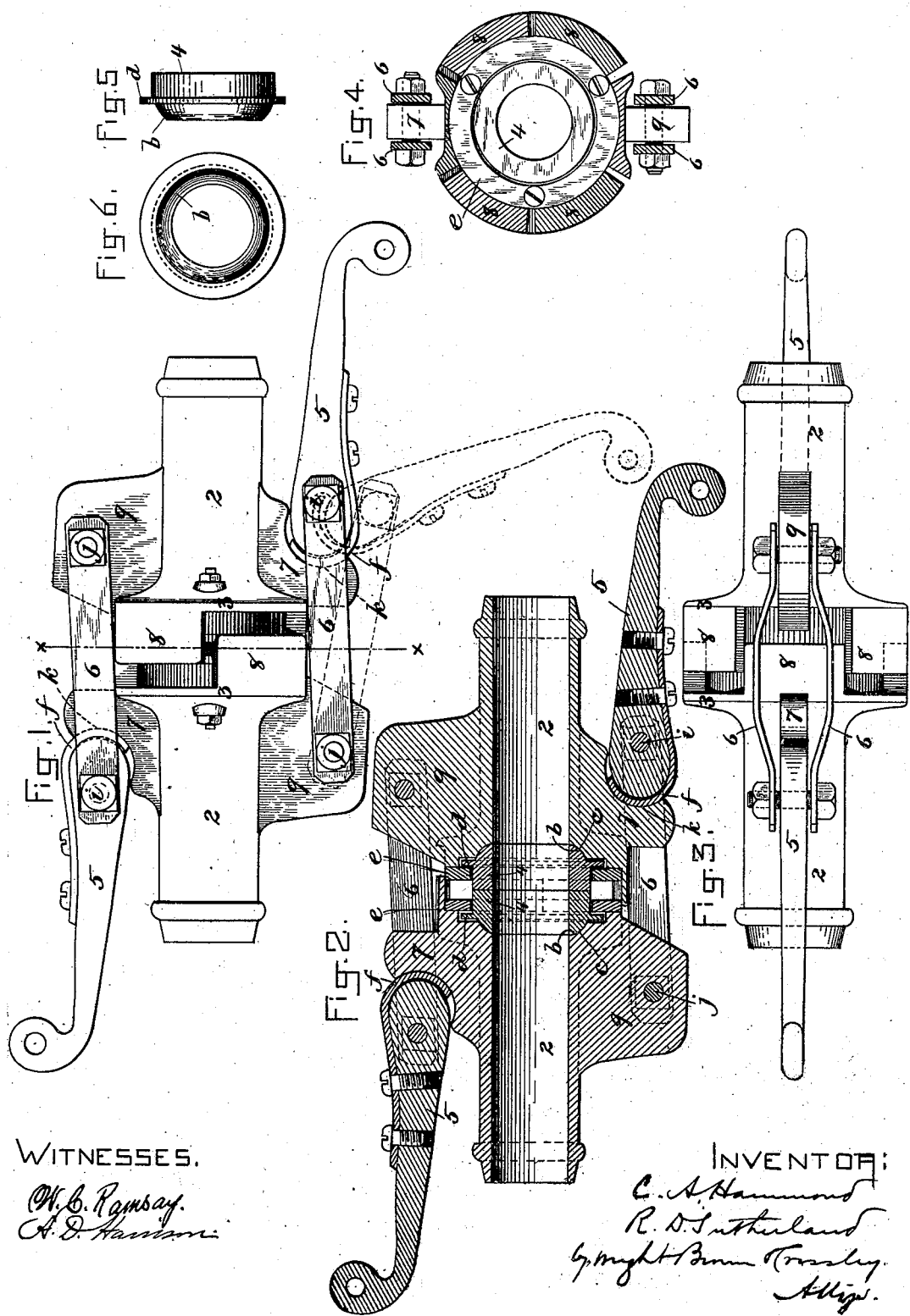
WITNESSES.
INVENTOR:

UNITED STATES PATENT OFFICE.

CHARLES A. HAMMOND, OF LYNN, AND ROBERT D. SUTHERLAND, OF BOSTON, MASSACHUSETTS.

STEAM-COUPLING.

SPECIFICATION forming part of Letters Patent No. 412,609, dated October 8, 1889.

Application filed November 19, 1888. Serial No. 291,249. (No model.)

*To all whom it may concern:*

Be it known that we, CHARLES A. HAMMOND, of Lynn, in the county of Essex, and ROBERT D. SUTHERLAND, of Boston, in the county of Suffolk, both in the State of Massachusetts, have invented certain new and useful Improvements in Steam-Couplings, of which the following is a specification.

This invention has for its object to provide a simple and efficient coupling for steam, hot-water, and air pipes, the members of which shall be capable of quick connection and separation, and which shall when connected form and maintain a tight joint.

The invention consists in the improvements which we will now proceed to describe and claim.

Of the accompanying drawings, forming a part of this specification, Figure 1 represents a side elevation of a coupling embodying our invention. Fig. 2 represents a longitudinal section of the same. Fig. 3 represents a side elevation taken from a different point from Fig. 1 and showing a modification. Fig. 4 represents a section on line $x\,x$, Fig. 1. Fig. 5 represents a side elevation of one of the gaskets. Fig. 6 represents a rear elevation of the gasket.

The same letters and figures of reference indicate the same parts in all the figures.

Our improved coupling is composed of two members, which are alike in construction, each having a tubular portion 2, a flange or head 3 at the outer end of the tubular portion, a gasket or bearing 4 surrounding the mouth of the conduit or passage-way, a lever 5, connected with an ear 9 on the coupling member by a link or strap 6, and a lug 7, having a seat for a similar lever connected with the other member. The flange 3 of each member is provided with projections 8, formed to enter spaces between like projections on the flange of the other member to prevent rotary motion of one member on the other when they are coupled. The levers 5 5 are pivoted to the links 6 6, so as to have shorter and longer arms, each shorter arm constituting a member of a toggle-joint, the other member of which is the link 6. As here shown, each link is composed of two straps or pieces of metal—one at each side of the lever 5—this construction being preferred because it leaves an open space in the link to receive the lug 7 when the shorter arm of the lever is seated on said lug. When the members of the coupling are brought together and the shorter arms of the levers are placed on the seats formed for them on the lugs 7 7, an inward movement of the longer arm of each lever will throw the pivot $i$, which connects the lever with its link 6, substantially into line with the pivot $j$, which connects said link with the ear 9 and the bearing portion $k$ of the shorter arm of the lever, said portion being the part of the convex end of said shorter arm that is at the greatest distance from the pivot or fulcrum $i$ of said arm, and bears on the lug 7 at a point about in line with the pivots $i\,j$ when the maximum pressure is attained, thus causing the shorter arm of the lever to exert a powerful pressure on the lug 7. This movement of the lever and link is virtually the straightening of the members of the toggle-joint, of which the link and the shorter arm of the lever are the members, the arrangement of said toggle-joint members being such as to make their action compressive instead of expansive, as in the ordinary toggle-joint. A similar action takes place at the opposite side of the coupling where the other link and lever co-operate in the same way with the other lug 7. The result is a powerful pressure of the abutting ends or reciprocal bearing-surfaces of the members against each other and the maintenance of a tight joint, the gaskets 4 4, which constitute the reciprocal bearing-surfaces of the members, being thus closely pressed together. It will be observed that the arrangement of the bearing-point $k$, whereby the same is brought into line with the pivots $i\,j$ when the maximum pressure is attained, enables the said pressure to hold the link 6 and lever 5 in their operative positions. We prefer to make said gaskets of metal, each being devoid of any yielding pressure and solidly backed by the body of the member. Each gasket has its back $b$ formed as a segment of a sphere, and the body of the coupling is formed with a concave seat $c$, fitting said back, so that the gasket is enabled to tip slightly without affecting the continuity of its bearing on the body of the coupling, the back *b* of the gasket and the concave seat *c* constituting to a certain extent a ball-and-socket joint. The gasket has a flange *d* back of its outer end, the body of the coupling member being recessed to receive said flange. A retaining-ring *e* is secured by screws to the head of the coupling member and covers the flange *d*. Said flange has a certain freedom of motion between the retaining-ring and the recessed head of the coupling member. It will be seen, therefore, that each gasket is capable of tipping, so that the two can bear squarely on each other whether the coupling members are in line with each other or not. The metal gaskets being incompressible and unyielding, (excepting as to their capability of tipping or rocking on their concave seats,) it is very desirable to give the levers 5 5 a yielding bearing on the lugs 7 7 to make the coupling operation easy, and to insure constant operative contact of the meeting ends of the unyielding gaskets and compensate for wear thereof. We prefer to afford this yielding pressure by means of springs *f f*, attached to the levers 5 5 and bent around the shorter arms thereof, as shown in Figs. 1 and 2, said springs bearing on the lugs 7 and affording the desired yielding pressure. We may, however, curve the links 6, as shown in Fig. 3, so that they will elongate under the strain exerted on them by the toggle action, and thus give a result similar to that of the springs *f f*. In case the curved links or side springs shown in Fig. 3 are used, the end springs *f f* will not be required. It will be seen that by thus enabling each lever to yield independently the couplings may be operatively connected while considerably out of line with each other—that is to say, when their heads 3 are not parallel the lever at one side yielding under such circumstances more than the lever at the other side. We do not limit ourselves, however, to the incompressible gaskets and the yielding toggle-joints, as the gasket may be made capable of sufficient yielding or compression to enable the yielding movement of the toggle-joints to be dispensed with, in which case the toggle-joints may be unyielding. We regard the incompressible gaskets as a very important advantage, however, on account of their superior durability.

It is obvious that the improved metallic gaskets as here shown may be used in connection with any suitable means for pressing the coupling members together. The longer arm of each lever 5 may be connected by a cord or chain with some part of the car to which the member of which said lever forms a part is attached, so that in the event of the separation of the cars without previous disconnection of the coupling members said chains pulling on the levers will displace the latter as the cars separate, and thus disconnect the coupling members.

We are aware that a coupling composed of two members, each having a compressive toggle-joint and a seat for a like toggle-joint in the other member, is not new; hence we do not claim the same, broadly.

We claim—

1. A coupling composed of two members, each having a concave seat, a metallic gasket permanently secured to it and provided with a flat outer surface to bear against the gasket of the other member, and a convex back formed to fit and move upon said seat, whereby said gaskets are enabled to tip independently and adjust themselves to the relative positions of the members, as set forth.

2. A coupling composed of members having concave seats, permanently-secured metallic gaskets having flat outer surfaces and convex backs fitted to move on said seats without disturbing the continuity of their bearing thereon, and levers for drawing said members together, substantially as described.

3. A coupling composed of members having concave seats, permanently-secured metallic gaskets having plane or flat outer surfaces, and convex backs fitted to move on said seats, external lugs 7, and yielding toggle-joints co-operating with said lugs, as set forth.

4. A coupling composed of members having concave seats, metallic gaskets fitted to tip or move on said seats, external lugs 7, links 6, pivoted to the body portions of the members, levers 5, pivoted to the free ends of said links and having the shorter and longer arms, and the springs or yielding terminals on said shorter arms, as set forth.

5. A coupling member having a concave seat *c*, a gasket formed with a convex back *b*, fitted to said seat and provided with a marginal flange *d*, and a retaining-ring secured to the body of the member outside of said flange, said ring being arranged to permit a tipping movement of the gasket-flange, as set forth.

6. A coupling composed of two members, each having a compressive toggle-joint and a seat for a like toggle-joint on the other member, each toggle-joint being composed of a link pivoted at one end to an ear on one of the coupling members, and a lever pivoted to the free end of the said link and having a longer outer arm and a shorter convex-ended inner arm, the bearing portion *k* of which is at the longitudinal center of said shorter arm, whereby, when the maximum pressure of the toggle-joint is attained, the parts thereof are substantially in line with each other, and are therefore in position to maintain said pressure and to be kept in operative position thereby, as set forth.

In testimony whereof we have signed our names to this specification, in the presence of two subscribing witnesses, this 15th day of November, A. D. 1888.

CHARLES A. HAMMOND.
ROBERT D. SUTHERLAND.

Witnesses:
C. F. BROWN,
A. D. HARRISON.